United States Patent
Taleb et al.

(10) Patent No.: US 11,518,257 B2
(45) Date of Patent: Dec. 6, 2022

(54) METHOD FOR CONTROLLING THE INPUT VOLTAGE FREQUENCY OF A DC-DC CONVERTOR

(71) Applicant: RENAULT s.a.s., Boulogne-Billancourt (FR)

(72) Inventors: Miassa Taleb, Yvry sur seine (FR); Abdelmalek Maloum, Chevilly Larue (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 79 days.

(21) Appl. No.: 17/252,114

(22) PCT Filed: May 27, 2019

(86) PCT No.: PCT/EP2019/063690
§ 371 (c)(1),
(2) Date: Dec. 14, 2020

(87) PCT Pub. No.: WO2019/238405
PCT Pub. Date: Dec. 19, 2019

(65) Prior Publication Data
US 2021/0257921 A1    Aug. 19, 2021

(30) Foreign Application Priority Data

Jun. 15, 2018   (FR) ..................... 18 55259

(51) Int. Cl.
*H02M 3/335*    (2006.01)
*H02M 1/00*    (2006.01)
(Continued)

(52) U.S. Cl.
CPC .............. *B60L 53/22* (2019.02); *H02J 7/007* (2013.01); *H02M 1/0003* (2021.05);
(Continued)

(58) Field of Classification Search
CPC ..... H02M 3/01; H02M 1/0022; H02M 1/4241
See application file for complete search history.

(56) References Cited

U.S. PATENT DOCUMENTS 6,487,093 B1 * 11/2002 Vogman ............ H02M 3/33561
363/21.02
6,778,412 B2 * 8/2004 Nagai ................ H02M 3/33592
361/87
(Continued)

FOREIGN PATENT DOCUMENTS

CN       106026619 A  * 10/2016  ........... H02H 7/1213

OTHER PUBLICATIONS

International Search Report dated Jul. 3, 2019 in PCT/EP2019/063690 filed on May 27, 2019, 2 pages.

*Primary Examiner* — Sisay G Tiku
(74) *Attorney, Agent, or Firm* — Oblon, McClelland, Maier & Neustadt, L.L.P.

(57) ABSTRACT

A method for controlling the input voltage frequency of a DC-DC converter includes calculating a control frequency value of the DC-DC converter. If the measured voltage is greater than the upper voltage limit, the control frequency corresponds to the minimum control frequency. If the measured voltage is less than the lower voltage limit, the control frequency corresponds to the maximum control frequency. If the measured voltage is between the upper voltage limit and the lower voltage limit, the control frequency corresponds to an average frequency calculated as a function of the difference between the setpoint voltage value and the measured voltage, upper error values and lower error values, and maximum and minimum control frequency values.

6 Claims, 5 Drawing Sheets (51) Int. Cl.
    *H02M 1/42*    (2007.01)
    *H02M 3/00*    (2006.01)
    *B60L 53/22*   (2019.01)
    *H02J 7/00*    (2006.01)

(52) U.S. Cl.
    CPC ....... *H02M 1/0022* (2021.05); *H02M 1/4208* (2013.01); *H02M 3/01* (2021.05); *H02M 3/33573* (2021.05); *H02M 3/33576* (2013.01); *B60L 2210/10* (2013.01); *H02J 2207/20* (2020.01); *H02M 1/4241* (2013.01)

(56) References Cited

U.S. PATENT DOCUMENTS

| | | | |
|---|---|---|---|
| 8,284,570 B2 | 10/2012 | Zhu et al. | |
| 2003/0048644 A1* | 3/2003 | Nagai | H02M 3/33592 363/21.09 |
| 2010/0157636 A1* | 6/2010 | Li | H02M 3/33515 363/124 |
| 2012/0112723 A1* | 5/2012 | He | H02M 3/335 323/293 |
| 2012/0113687 A1* | 5/2012 | Wildrick | H02M 3/3378 363/21.02 |
| 2013/0335043 A1* | 12/2013 | He | G05F 1/10 323/234 |
| 2014/0306669 A1* | 10/2014 | Dai | H02M 3/156 323/299 |
| 2016/0268911 A1* | 9/2016 | Espino | H02M 1/08 |
| 2017/0085259 A1 | 3/2017 | Hayakawa et al. | |
| 2017/0373602 A1* | 12/2017 | Lian | H02M 3/3387 |
| 2021/0296999 A1* | 9/2021 | Taleb | H02M 3/33573 |

\* cited by examiner

METHOD FOR CONTROLLING THE INPUT VOLTAGE FREQUENCY OF A DC-DC CONVERTOR

The present invention relates to the field of electric battery chargers, in particular for electric or hybrid motor vehicles.

The invention relates more precisely to a method for controlling the frequency of the input voltage of a DC current to DC current converter for an electric battery charger.

Electric battery chargers, more commonly called chargers, for electric motor vehicles require significant charging powers, possibly ranging for example up to 22 kW in three-phase operation or 7 kW in single-phase operation.

These chargers generally comprise two power conversion stages: a first power factor correction stage, generally abbreviated to PFC, performing the AC-to-DC conversion of the grid voltages to a DC bus, and a second DC-to-DC conversion stage, called DC-to-DC, controlling the output current required for charging the battery and galvanically isolating the charger through a transformer.

Figure 1:
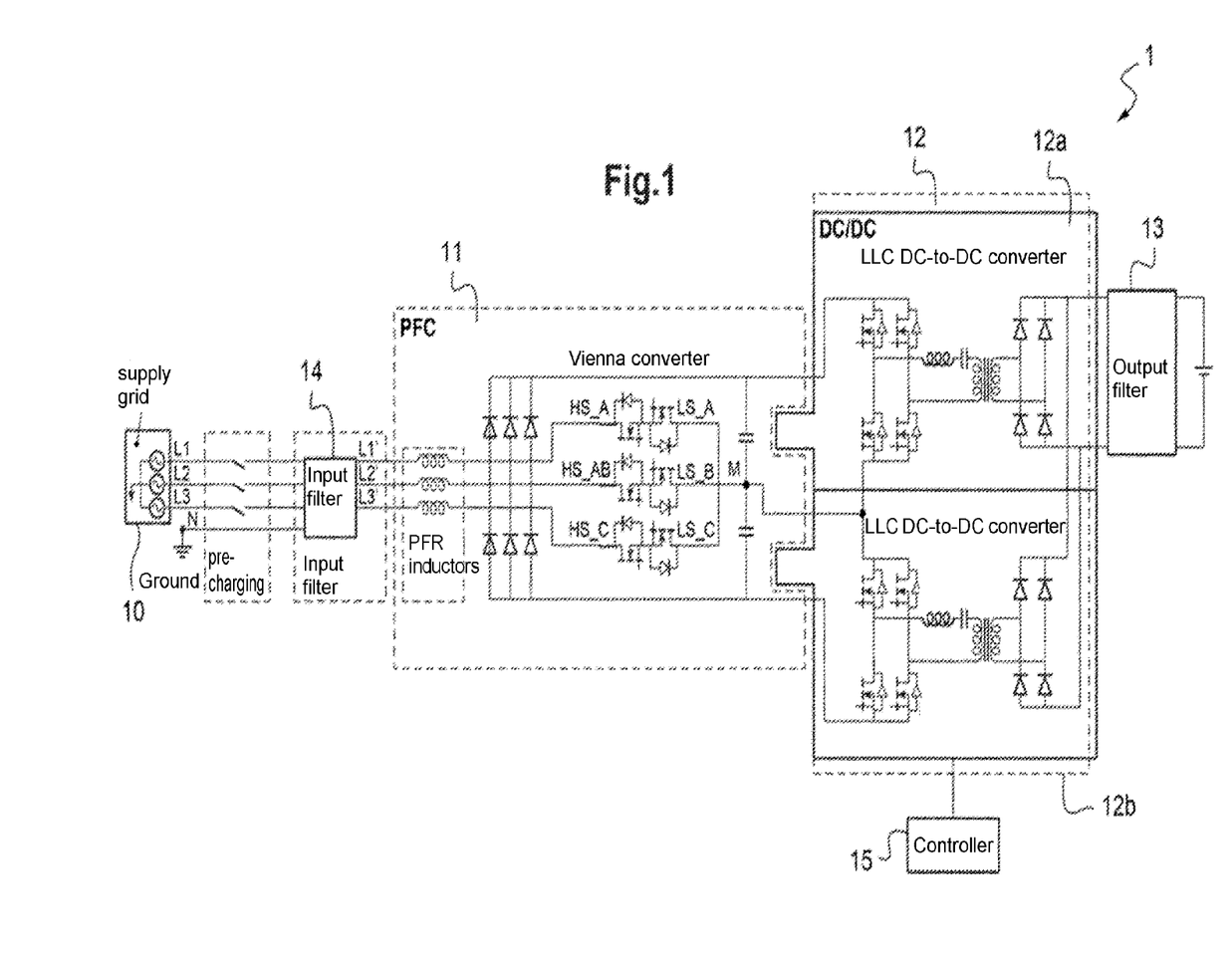
FIG. 1 is a schematic view of an electric battery charger known from the prior art.

With reference to FIG. 1 from the prior art, two output DC voltage buses, at the terminals of the output capacitors, are each coupled to a DC-to-DC converter.

Figure 2:
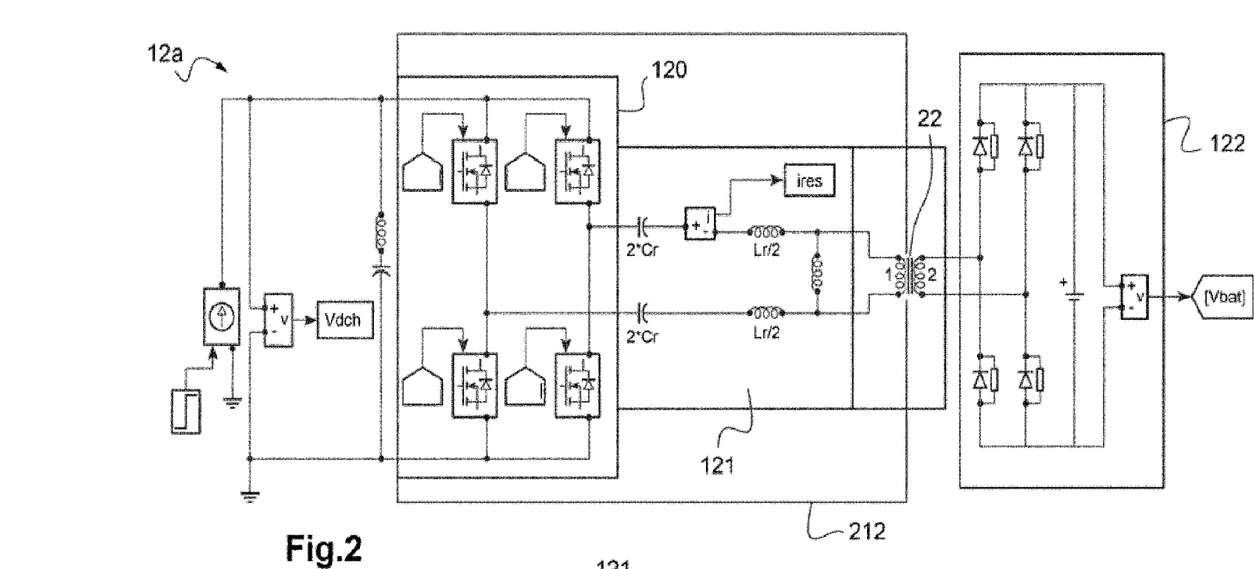
FIG. 2 is a detailed view of a DC current to DC current converter for a charger according to FIG. 1.

The DC-to-DC may in particular be an LLC, as shown in FIG. 2, comprising a transformer 22 that galvanically isolates the charger.

Figure 3:
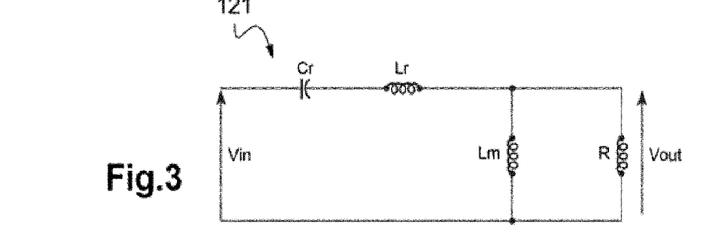
FIG. 3 is a simplified diagram of an LLC circuit of a DC current to DC current converter according to FIG. 2.

FIG. 3 shows a simplified diagram of the assembly of the DC-to-DC converter of FIG. 2, comprising a capacitor Cr and two inductors Lr and Lm. The input voltage corresponds to the DC bus and the output voltage is the voltage of the battery. The gain then corresponds to the ratio of the two voltages.

The first MOSFET bridge 120 of the LLC DC-to-DC operates with a duty cycle of 50% and is controlled in terms of frequency. Specifically, frequency control makes it possible to adjust the gain of the DC-to-DC and to regulate the voltage of the DC buses at the input of the charger to a given setpoint value. Depending on the voltage of the battery and the required power, the frequency may fluctuate for example between 60 kHz and 200 kHz.

The solutions proposed in the prior art for controlling this type of DC-to-DC converter generally regulate the output voltage, such as the one disclosed in the publication DRGOŇA, Peter, FRIVALDSKÝ, Michal and SIMONOVÁ, Anna. *A New Approach of Control System Design for LLC Resonant Converter. In: MATLAB for Engineers-Applications in Control, Electrical Engineering, IT and Robotics. InTech,* 2011, in which the output voltage of the DC-to-DC is controlled using the chopping frequency. A transfer function between duty cycle and output voltage is deduced from identification methods, using a PSPICE hardware module simulating the dynamic ranges of the output voltage responses to a frequency increment. A controller is then designed based on the previously deduced transfer function.

The transfer function may also be obtained using the method called "small signal", which consists in deducing a transfer function from an excitation around an operating point, and measuring the response of the DC-to-DC, as described in the doctorate thesis by YANG, Bo. *Topology investigation of front end DC/DC converter for distributed power system.* 2003. However, this transfer function is applicable only to the operating point under consideration, and becomes obsolete upon each change of operating point. It is therefore necessary to recalculate it each time. Such a solution is also relative complex to implement and expensive in terms of computation time.

Control operations in terms of controlling DC current if the output voltage varies over a low range are also known.

Lastly, the publication FANG, Zhijian, WANG, Junhua, DUAN, Shanxu et. al. *Control of an LLC Resonant Converter Using Load Feedback Linearization. IEEE Transactions on Power Electronics,* 2018, vol. 33, no. 1, p. 887-898 is also known, in which control is constructed through feedback linearization so as to control the output voltage of an LLC DC-to-DC. This publication describes a 7-state nonlinear model, which is thereafter reduced to 2 states and proposes control through a PI loop. However, such a solution involves complex and expensive hardware and software adaptations.

It is the case that the output voltage is imposed by the battery. Furthermore, it is the case, in particular in electric motor vehicle applications, that this output voltage varies over a wide range of values, for example between 250 V and 430 V.

Therefore, it is desirable to control the DC voltage at input, since this makes it possible to impose a DC voltage at the terminals of the capacitors at the output of the PFC.

However, controlling the DC voltage at the input of the LLC DC-to-DC converter is a subject for which the prior art does not offer any satisfactory solution.

There is hence the need for a solution for controlling the DC voltage at the input of the LLC DC-to-DC quickly and reliably.

What is proposed is a method for controlling the frequency of the input voltage of a DC current to DC current converter, comprising preliminary steps of:

defining a maximum control frequency value and a minimum control frequency value;

defining a setpoint voltage value;

defining an upper error value and an associated upper limit voltage value; a lower error value and an associated lower limit voltage value, said upper and lower limit voltage values defining an error amplitude around said setpoint voltage value;

the method furthermore comprising:

a step of obtaining a measured value of the input voltage;

a step of calculating a control frequency value of said DC current to DC current converter, wherein:

if the measured voltage is greater than said upper limit voltage, the control frequency corresponds to said minimum control frequency;

if the measured voltage is lower than said lower limit voltage, the control frequency corresponds to said maximum control frequency; and if the measured voltage is between said upper limit voltage and said lower limit voltage, the control frequency corresponds to an average frequency calculated on the basis of the difference between the setpoint voltage value and the measured voltage, the upper and lower error values and the maximum and minimum control frequency values.

It is thus possible to achieve a fast and robust method for controlling the input voltage of a DC current to DC current converter.

Advantageously and without limitation, when the measured voltage is between said upper limit voltage and said lower limit voltage, the control frequency is calculated by applying the following equation:

$$F_{MOY} = \frac{(error + eps) * FR_{MAX} - (error - eps) * FR_{MIN}}{2 * eps}$$

in which the value error corresponds to the difference $V_{DCR}-V_{DCM}$ between the setpoint voltage value and the measured voltage. It is thus possible to ensure precise convergence toward the setpoint value when the measured voltage is close to the setpoint voltage, and cancel out the static error.

Advantageously and without limitation, the control operation is controlled at least in part by an open-loop controller. The control frequency calculation is thus able to be refined.

The control operation is in particular controlled in terms of frequency by a proportional-integral controller only when the measured voltage is between said upper limit voltage and said lower limit voltage. It is thus possible to improve the control by selectively refining the control frequency calculation when the measured voltage is close to the setpoint voltage.

The invention also relates to a device for controlling the frequency of a DC current to DC current converter comprising means for implementing the method as described above.

The invention also relates to a charger for charging an electric accumulator battery comprising:
  a power factor correction stage;
  an LLC resonant DC current to DC current converter; and
  a device for controlling the frequency of said DC current to DC current converter as described above.

Other features and advantages of the invention will become apparent on reading the description given below of one particular embodiment of the invention, given by way of indication but without limitation, with reference to the appended drawings, in which:

FIG. 4a is a schematic depiction of the method according to one embodiment of the invention;

FIG. 4b is a detailed view of a calculation step of the method according to the embodiment of FIG. 4a;

FIG. 5 is a schematic depiction of the applied frequency control of the method, with time on the abscissa and volts on the ordinate, as a function of the limit voltages, the setpoint voltage and the measured voltage, of the calculation step of the method according to the embodiment of FIG. 4a; and FIG. 6 is a flowchart of the method implemented according to the embodiment of FIG. 4a.

FIGS. 1 to 6 relate to the same embodiment and will be commented upon at the same time.

With reference to FIG. 1, an electric battery 13 charger 1 connected to a three-phase electricity grid 10 comprises a power factor correction stage 11, also called PFC stage 11, and DC current to DC current converters DC-to-DC 12a and 12b each having an inverter 212.

The three-phase electricity grid 10 is fitted on an input filter 14 transmitting filtered input currents to the PFC stage 11.

At the output of the PFC 11, two DC voltage buses, connected to the terminals of the output capacitors of the PFC stage 11, are each coupled to a DC-to-DC converter 12a, 12b, connected at output in parallel with an accumulator battery 13.

Each DC-to-DC 12a, 12b, just one example of which is shown in FIG. 2, comprises an input MOSFET bridge 120, an LLC circuit 121, a simplified circuit diagram of which is shown in FIG. 3, a transformer 22 and an output diode bridge 122.

The charger 1 furthermore comprises means 15 for controlling the DC current to DC current converters 12, able to implement a control method 60 according to the invention.

The control method 60 according to the invention aims to control the frequency of the input voltages of the DC current to DC current converters 12.

Figures 4A, 4B:
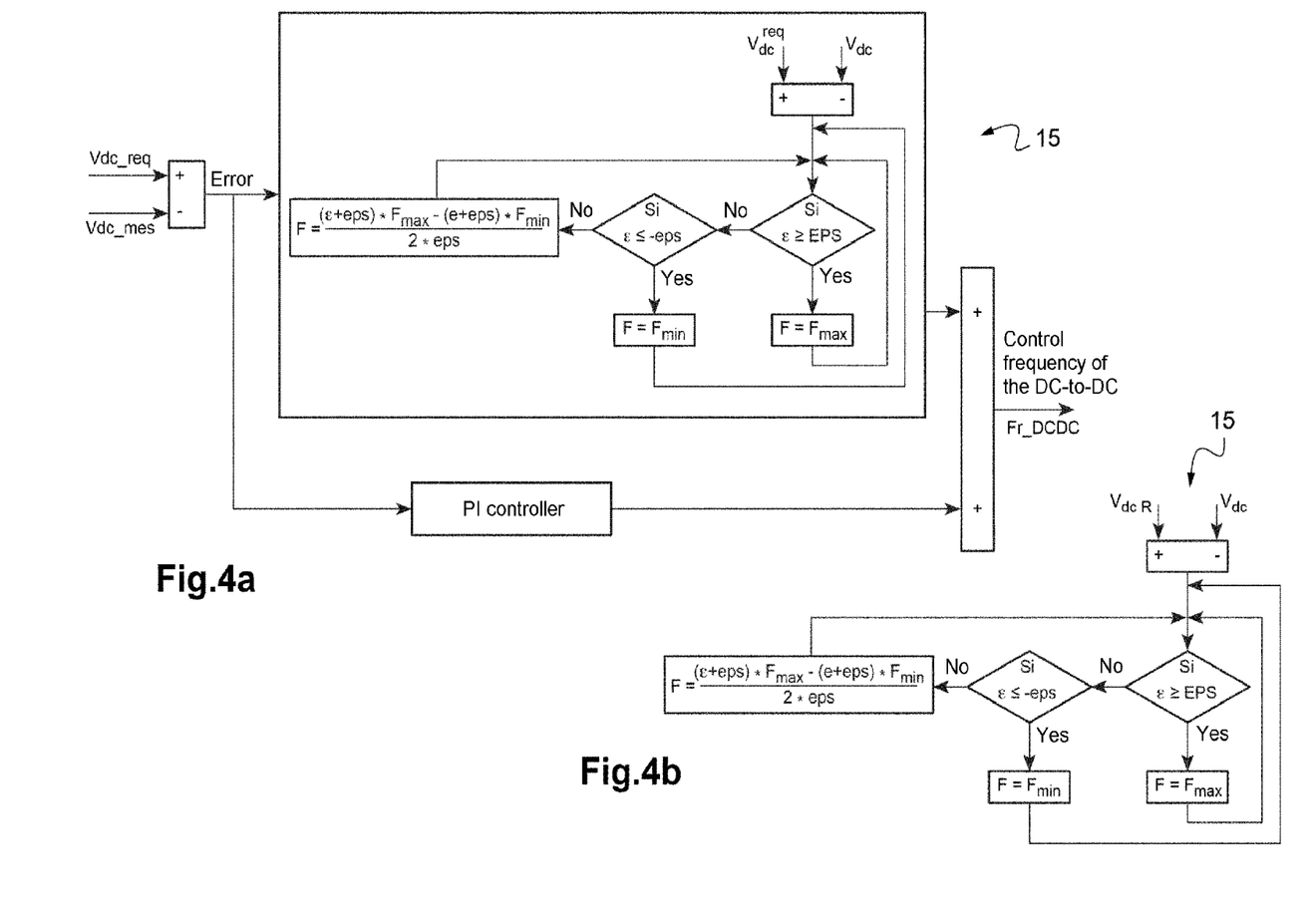
Figure 5:
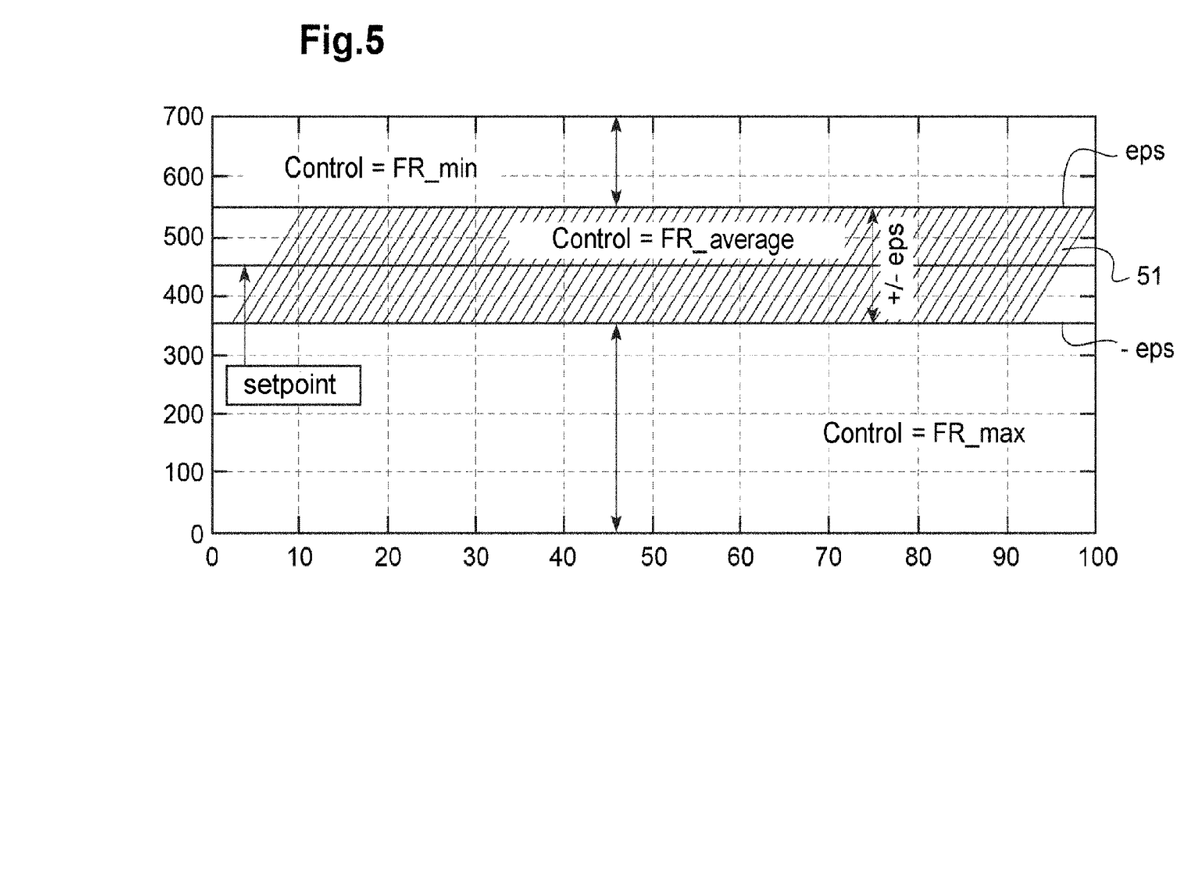
Figure 6:
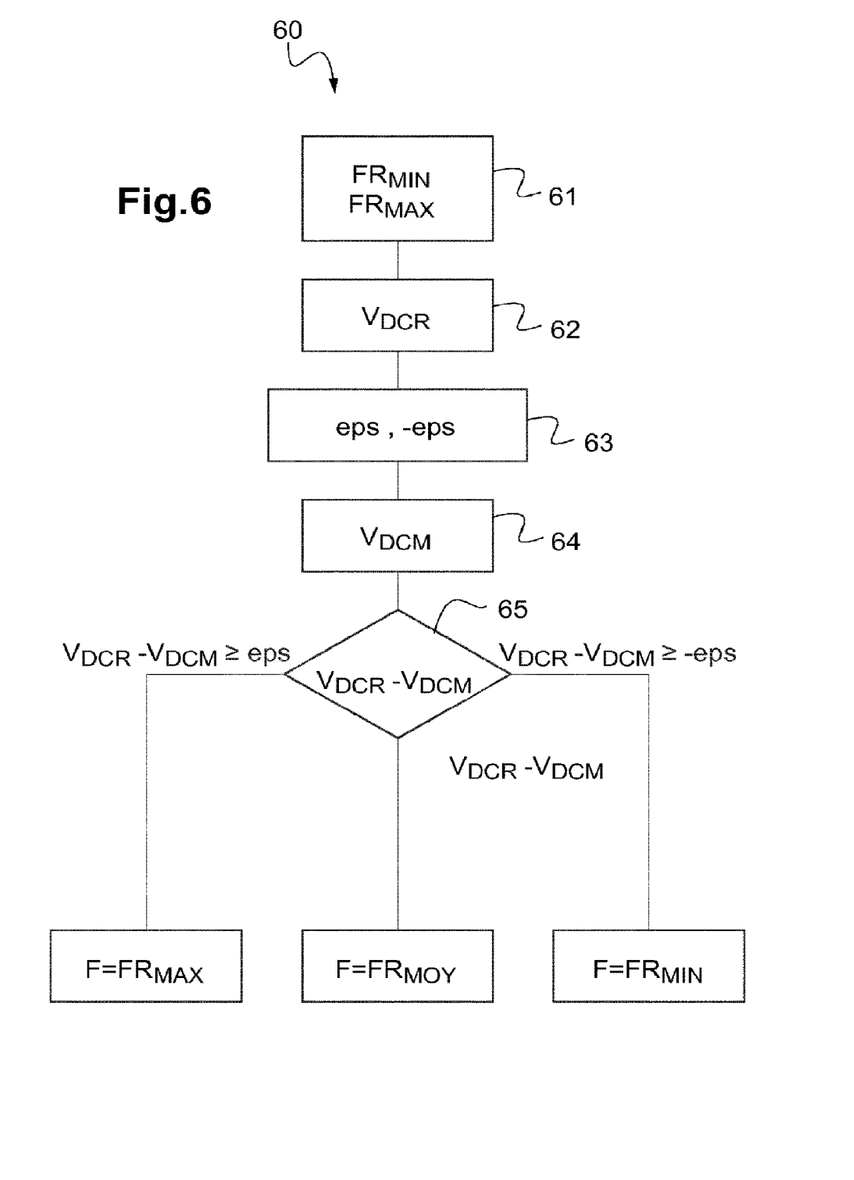

With reference to FIGS. 4, 5 and 6, the method for controlling a DC current to DC current converter comprises a plurality of preliminary steps 61, 62, 63. These preliminary steps 61-63 are independent of one another. The preliminary steps 61-63 aim to define operating parameters of the method; they may be performed before the method is implemented, for example in a calibration phase, or dynamically at the start of the method.

These preliminary steps 61-63 may furthermore be reproduced during the operation of the method 60 in order to dynamically modify the operating parameters of the method.

First of all, a step of defining 61 a maximum control frequency value $FR_{MAX}$ and a minimum control frequency value $FR_{MIN}$ is implemented, for example in this case a maximum frequency $FR_{MAX}$ of 200 kHz, and a minimum frequency $FR_{MIN}$ of 60 kHz.

A step of defining 62 a setpoint voltage value $V_{DCM}$ towards which the input voltage should converge is then implemented. In the exemplary embodiment of FIG. 5, $V_{DCR}$=450 V.

An error zone 51, defined by two error values, an upper error value eps and a lower error value −eps, is then defined 63, these two error values making it possible to define an upper limit voltage value $V_{DRC}$+eps and a lower limit voltage value $V_{DCR}$−eps.

In this exemplary embodiment, an error voltage +eps=100 V and −eps=−100 V is defined.

These upper $V_{DCR}$+eps and lower $V_{DCR}$−eps limit voltage values framing the setpoint voltage $V_{DCR}$ thus define an error amplitude around the setpoint voltage $V_{DCR}$.

In this embodiment, the upper error value eps and lower error value −eps have the same absolute value, so as to define a symmetrical error zone around the setpoint voltage value $V_{DCR}$. However, the invention is not limited to these absolute values being the same, and there may be provision for an upper error value eps and a lower error value −eps having different absolute values.

The method then implements a step of obtaining 64 a measured value of the input voltage $V_{DCM}$.

A step of calculating 65 a control frequency value of the DC current to DC current converter is then implemented.

In this calculation step 65, the measured input voltage $V_{DCM}$ is compared with the upper $V_{DCR}$+eps and lower $V_{DCR}$−eps limit voltage values.

If the measured voltage $V_{DCM}$ is greater than or equal to said upper limit voltage $V_{DCR}$+eps, then a control frequency F equal to said minimum control frequency $FR_{MIN}$ is applied.

If the measured voltage $V_{DCM}$ is less than or equal to the lower limit voltage $V_{DCR}$−eps, then a control frequency F equal to the maximum control frequency $FR_{MAX}$ is applied.

Lastly, if the measured voltage $V_{DCM}$ is strictly between said upper limit voltage $V_{DCR}$+eps and said lower limit voltage $V_{DCR}$−eps, the control frequency F corresponds to an average frequency $F_{MOY}$ that is calculated on the basis of the difference between the measured voltage and the setpoint voltage, the values of the upper and lower limit errors and the values of the maximum and minimum control frequency.

This average frequency $F_{MOY}$ is calculated using the following equation:

$$F_{MOY} = \frac{(error + eps) * FR_{MAX} - (error - eps) * FR_{MIN}}{2 * eps} \quad 5$$

in which:
the value error corresponds to the difference between the setpoint voltage value $V_{DCR}$ and the measured voltage $V_{DCM}$, that is to say error=$V_{DCR}$-$V_{DCM}$.

In other words, the pair of error parameters –eps, eps makes it possible to define an error zone close to the setpoint $V_{DCR}$, in which the control means calculate a frequency $F_{MOY}$ that makes it possible to converge precisely on the setpoint value $V_{DCR}$.

Specifically, when the error $V_{DCR}$-$V_{DRM}$ reaches one of the thresholds –eps, eps, a control frequency is calculated so as to precisely reach the setpoint and cancel out the static error.

Above or below this error zone, respectively, the minimum frequency $FR_{MIN}$ or maximum frequency $FR_{MAX}$ is applied as described by the following logic in order to ensure effective convergence.

With reference to FIG. 4a, a proportional integral controller 42, more commonly called PI controller, is activated when the measured voltage $V_{DCM}$ is strictly between said upper limit voltage $V_{DCR}$+eps and said lower limit voltage $V_{DCR}$–eps. This makes it possible to refine the calculation of the frequency F to be applied and improves convergence of the measured voltage over a few volts.

The output of the first control stage 41 therefore arrives as what is called a feed-forward open-loop control command and is added 43 to the results obtained by the PI controller 42.

The invention claimed is:

1. A method comprising:
controlling frequency of an input voltage of an LLC DC current to DC current converter operating with a duty cycle of 50% and controlled in terms of frequency, by
defining a maximum control frequency value and a minimum control frequency value;
defining a setpoint voltage value;
defining an upper error value and an associated upper limit voltage value and a lower error value and an associated lower limit voltage value, said upper and lower limit voltage values defining an error amplitude around said setpoint voltage value;
obtaining a measured value of the input voltage; and
calculating a control frequency value of said DC current to DC current converter, wherein:
when the measured input voltage is greater than said upper limit voltage, the control frequency corresponds to said minimum control frequency;
when the measured input voltage is lower than said lower limit voltage, the control frequency corresponds to said maximum control frequency; and
when the measured input voltage is between said upper limit voltage and said lower limit voltage, the control frequency corresponds to an average frequency calculated based on a difference between the setpoint voltage value and the measured input voltage, the upper and lower error values and the maximum and minimum control frequency values.

2. The method as claimed in claim 1, wherein, when the measured input voltage is between said upper limit voltage and said lower limit voltage, the control frequency is calculated by applying the following equation:

$$F_{MOY} = \frac{(error + eps) * FR_{MAX} - (error - eps) * FR_{MIN}}{2 * eps}$$

in which the value error corresponds to the difference between the setpoint voltage value and the measured input voltage, eps is the upper error value, $FR_{MAX}$ is the maximum control frequency value, $FR_{MIN}$ is the minimum control frequency value.

3. The method as claimed in claim 1, wherein a control operation is controlled at least in part by an open-loop controller.

4. The method as claimed in claim 3, wherein the control operation is controlled in terms of frequency by a proportional-integral controller only when the measured input voltage is between said upper limit voltage and said lower limit voltage.

5. A device comprising:
circuitry configured to control frequency of an input voltage of an LLC DC current to DC current converter operating with a duty cycle of 50% and controlled in terms of frequency, by
defining a maximum control frequency value and a minimum control frequency value,
defining a setpoint voltage value,
defining an upper error value and an associated upper limit voltage value and a lower error value and an associated lower limit voltage value, said upper and lower limit voltage values defining an error amplitude around said setpoint voltage value,
obtaining a measured value of the input voltage, and
calculating a control frequency value of said DC current to DC current converter, wherein:
when the measured input voltage is greater than said upper limit voltage, the control frequency corresponds to said minimum control frequency,
when the measured input voltage is lower than said lower limit voltage, the control frequency corresponds to said maximum control frequency, and
when the measured input voltage is between said upper limit voltage and said lower limit voltage, the control frequency corresponds to an average frequency calculated based on a difference between the setpoint voltage value and the measured input voltage, the upper and lower error values and the maximum and minimum control frequency values.

6. A charger to charge an electric accumulator battery, the charger comprising:
a power factor correction stage;
an LLC resonant DC current to DC current converter; and
a device including circuitry configured to control frequency of an input voltage of the LLC resonant DC current to DC current converter operating with a duty cycle of 50% and controlled in terms of frequency, by
defining a maximum control frequency value and a minimum control frequency value,
defining a setpoint voltage value,
defining an upper error value and an associated upper limit voltage value and a lower error value and an associated lower limit voltage value, said upper and lower limit voltage values defining an error amplitude around said setpoint voltage value,
obtaining a measured value of the input voltage, and calculating a control frequency value of said DC current to DC current converter, wherein:

when the measured input voltage is greater than said upper limit voltage, the control frequency corresponds to said minimum control frequency, when the measured input voltage is lower than said lower limit voltage, the control frequency corresponds to said maximum control frequency, and when the measured input voltage is between said upper limit voltage and said lower limit voltage, the control frequency corresponds to an average frequency calculated based on a difference between the setpoint voltage value and the measured input voltage, the upper and lower error values and the maximum and minimum control frequency values.

* * * * *